United States Patent [19]

Maughlin et al.

[11] 4,196,876
[45] Apr. 8, 1980

[54] BANNER TOWING ADAPTER

[75] Inventors: Richard K. Maughlin, Great Mills; Ronald D. Moore, Hollywood, both of Md.

[73] Assignee: The United States of America as represented by the Secretary of the Navy, Washington, D.C.

[21] Appl. No.: 925,729

[22] Filed: Jul. 18, 1978

[51] Int. Cl.² .............................................. B64D 3/02
[52] U.S. Cl. ............................... 244/1 TD; 24/230 A; 244/3; 273/360; 294/83 R
[58] Field of Search ................... 244/1 TD, 3, 110 H, 244/113, 137 R; 273/105.3; 343/707; 40/215; 294/83 R, 84; 24/230 A, 230 AP, 232, 241 SL, 241 PS; 280/504

[56] References Cited

U.S. PATENT DOCUMENTS

| 1,786,523 | 12/1930 | Doering | 294/83 R |
| 2,011,202 | 8/1935 | Satterlee | 40/215 |
| 2,202,771 | 5/1940 | DuPont | 40/215 |
| 2,591,487 | 4/1952 | Wirz | 280/504 |
| 3,058,702 | 10/1962 | Sharples et al. | 244/1 TD X |
| 3,895,767 | 7/1975 | Maughlin et al. | 244/3 |

Primary Examiner—Barry L. Kelmachter
Attorney, Agent, or Firm—R. S. Sciascia; Sol Sheinbein

[57] ABSTRACT

A banner towing adapter for use in the towing of a banner or target by an aircraft of the type having an arresting tail hook assembly. The towing adapter is installable in the hollow tail hook attachment pin of the aircraft by means of an expanding sleeve. The sleeve is fixed to a first upwardly extending immovable arm which secures the sleeve to the tail hook support structure located on the aircraft. A second arm, rotatably attached to the sleeve and coupled to the tail hook, is provided at its distal end with a hook suitable for securing a towline from the banner to be towed. The towline securing hook is disposable between two hook retainers which act as a constraint when the towline is on the hook. One of the retainers is disposed at the far end of the first arm while the other hook retainer is rotatable about a point fixed on the first arm. The second retainer is lockable in a retaining position by a ball lock pin. When the tail hook moves to the down position away from the aircraft the hook is rotated away from the retainers thus releasing the towline and the attached banner.

14 Claims, 8 Drawing Figures

4,196,876

BANNER TOWING ADAPTER

BACKGROUND OF THE INVENTION

This invention relates to the towing of gunnery targets by aircraft and more particularly to an adapter for permitting the towing of an aerial target by a fighter aircraft.

As is obvious to those skilled in the art, attack fighter aircraft are capable of air-to-air gunnery. In order to obtain proficiency in this tactical maneuver, aircraft squadrons need to be able to tow aerial banners or targets behind them. However, some aircraft, such as the F-14, which usually have an arresting tail hook assembly for landing on aircraft carriers, have no inherent means for attachment of such an aerial banner and ordinarily two adapters are required in order to provide a point of attachment.

SUMMARY OF THE INVENTION

Accordingly, the present invention comprises a towing adapter which can be fastened to the arresting tail hook assembly of the type carried by some aircraft. The adapter is designed to fit an aircraft through the use of an expanding sleeve constructed so as to be inserted within the hollow tail hook attachment pin of the aircraft which secures the tail hook to the aircraft. The sleeve is provided with a fixed arm which extends upwardly toward the tail hook support structure and secures the sleeve to the support structure. A rotatable arm is attached to the sleeve and has a hook suitable for securing a towline at its far end. The hook is disposed between two retainers extending out from the sleeve assembly which are designed to contain a towline on the hook. The hook is also provided with a release mechanism which allows it to rotate away from the retainers and release the towline and thus the banner.

OBJECTS OF THE INVENTION

It is therefore an object of this invention to permit attachment of an aerial banner or target to an aircraft.

Another object of this invention is to provide a towing adapter for use with aircraft having an arresting tail hook assembly so that targets may be drawn behind the aircraft on towlines and thus used for aerial gunning practice.

A further object of the present invention is to provide a quick attachable banner towing adapter for aircraft having an arresting tail hook assembly.

A still further object is the provision of a safe banner towing adapter which releases the target being towed by lowering the tail hook.

Other objects, advantages and novel features of the present invention will become apparent from the following detailed description of the invention when considered in conjunction with the accompanying drawings.

BRIEF DESCRIPTION OF THE DRAWINGS

Referring now to FIG. 1, there is shown in schematic form the arresting tail hook assembly of a fighter aircraft 10. As can be seen, a tail hook 12 is rotatably supported by a hollow attachment pin 14 which is fixedly supported by tail hook support structure generally designated 16. Prior to landing of the aircraft, the pilot lowers the tail hook, i.e., places it in the hook down position as shown by 12', by utilizing an unlocking mechanism generally at 17. A dashpot 18 prevents the tail hook from being lowered at too rapid a rate and thus protects the hook from untoward damage. A retract actuator 20 provides the operative force to bring the tail hook 12 into the up hook position as shown by the solid lines in FIG. 1.

FIG. 2 illustrates the banner towing adapter of the present invention in relation to the tail hook and the tail hook support structure. FIGS. 2 and 3 show that the adapter of the present invention comprises an attachment pin assembly 22, stationary plate assembly 24, hook plate assembly 26 and a swivel block assembly 28.

Figure 1:
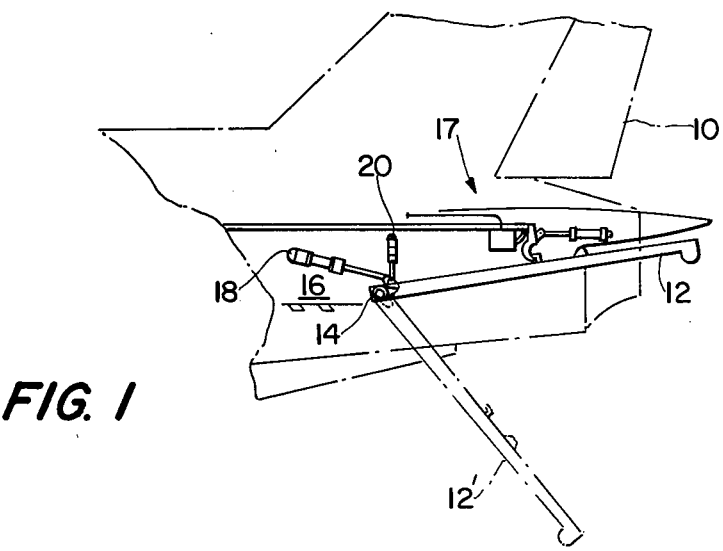
FIG. 1 is a schematic view of the installation location for the banner towing adapter of the present invention.

The attachment pin assembly 22 is shown as a pin 30 of generally cylindrical cross-section having a first section 32, provided with a cylindrical recess 34 and a second section 36, of reduced cross-sectional area. Running between the first and second sections is an inclined mandrel surface 38 which performs a function that will be subsequently described. Pin 30 has a central cylindrical bore 40 which allows the passage of a hexhead bolt 42 therethrough. Bolt 42 attaches pin 30 to a slotted collet 44. As will be readily understood by those skilled in the art, the foregoing description defines an expanding sleeve. As the bolt 42 is tightened, collet 44 is drawn against the mandrel 38 such that the outside diameter of the collet expands. Relative rotation of pin 30 with respect to collet 44 is precluded by means of pins 46.

In use, the attachment pin assembly 22 is inserted in the hollow tail hook attachment pin 14 of the aircraft. The bolt 42 is then tightened with a concomittant expansion of collet 44. Thus, the assembly 22 functions as a means to fix the banner towing adapter to an aircraft.

Figure 2:
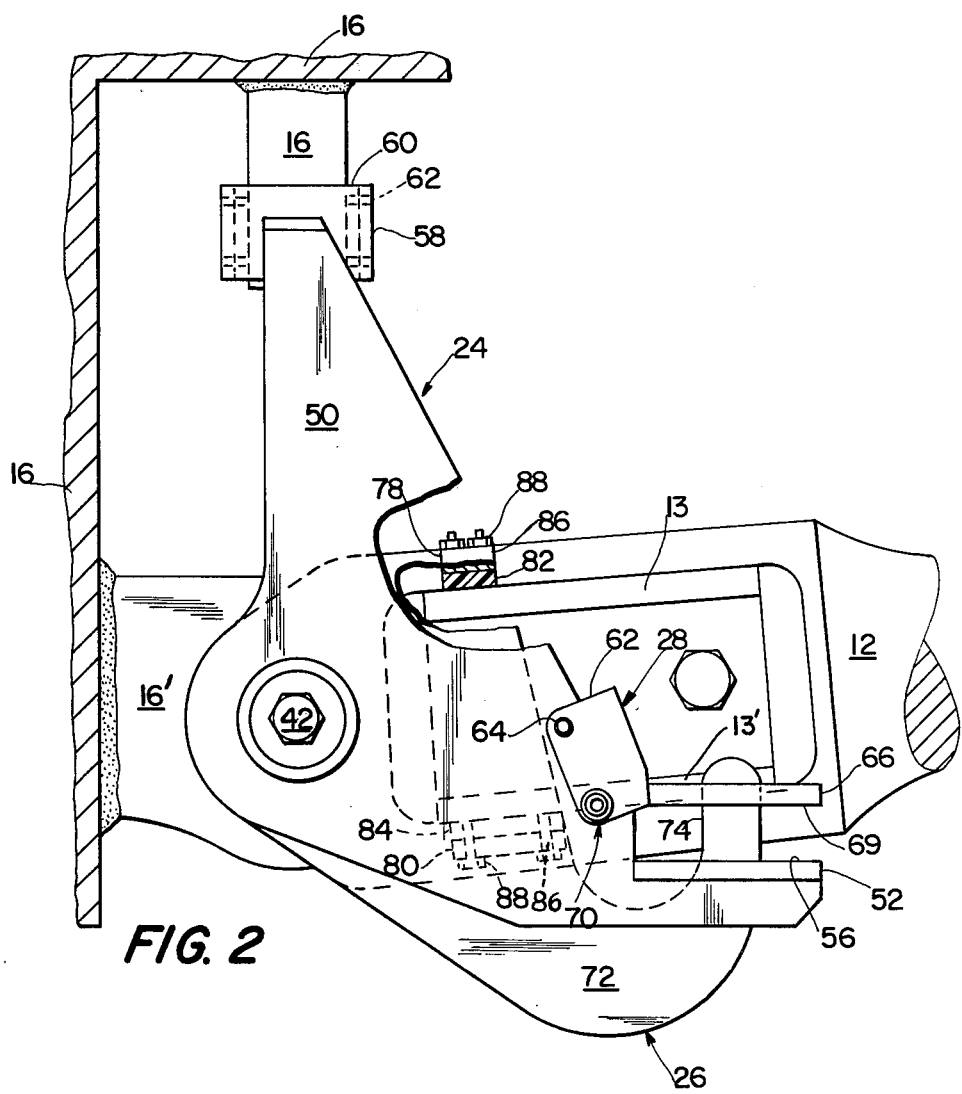
FIG. 2 shows the cooperation of the banner towing adapter with the arresting tail hook of an aircraft with parts of the adapter broken away.
Figure 3:
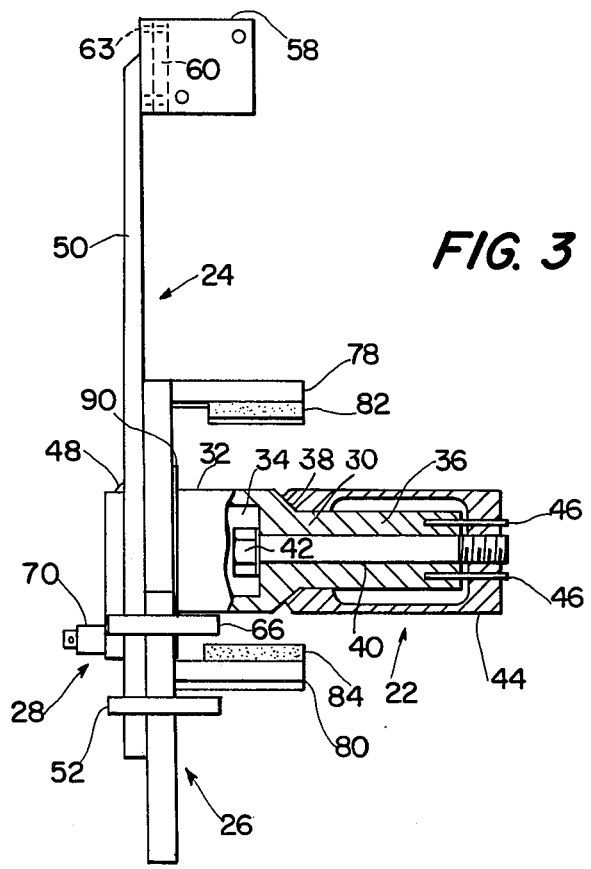
FIG. 3 shows an end view of the present banner towing adapter with parts broken away.
Figure 4A:
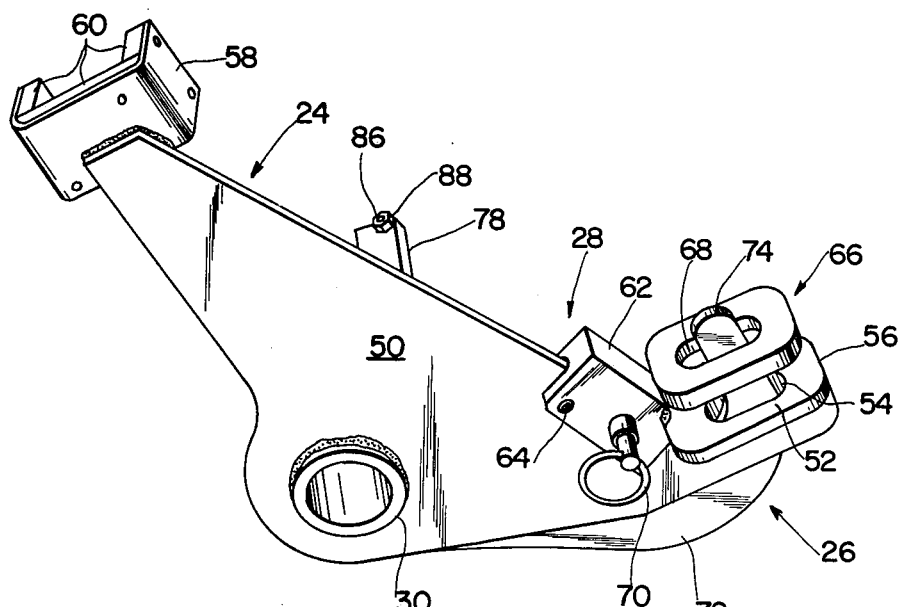
FIG. 4a illustrates the left side view of the instant banner towing adapter.

The stationary plate assembly 24 is connected to the attachment pin assembly 22 as shown in FIG. 3 by means of a weld 48 or other suitable means. Assembly 24 is shown in FIGS. 2, 3 and especially FIG. 4a as a first upwardly stationary plate, or extending arm 50 which secures the expanding sleeve or assembly 22 to the tail hook support structure 16 on the aircraft. The stationary plate assembly 24 comprises the stationary plate 50 having at its far end a first generally rectangular retainer plate or first retainer 52 which is provided with a first rectangular opening 54 on its open surface 56. Disposed at the other end of the plate 50 is an attachment bracket 58 of generally U-shaped configuration. Bracket 58 fixes the assembly 24 and thus assembly 22 with respect to the aircraft 10 by coacting with a stud which forms a portion of the tail hook support structure 16. Teflon spacers 60, connected to bracket 58 by means of screws 63, prevent damage to the aircraft structure by the adapter and act as vibration dampers.

Figure 5A:
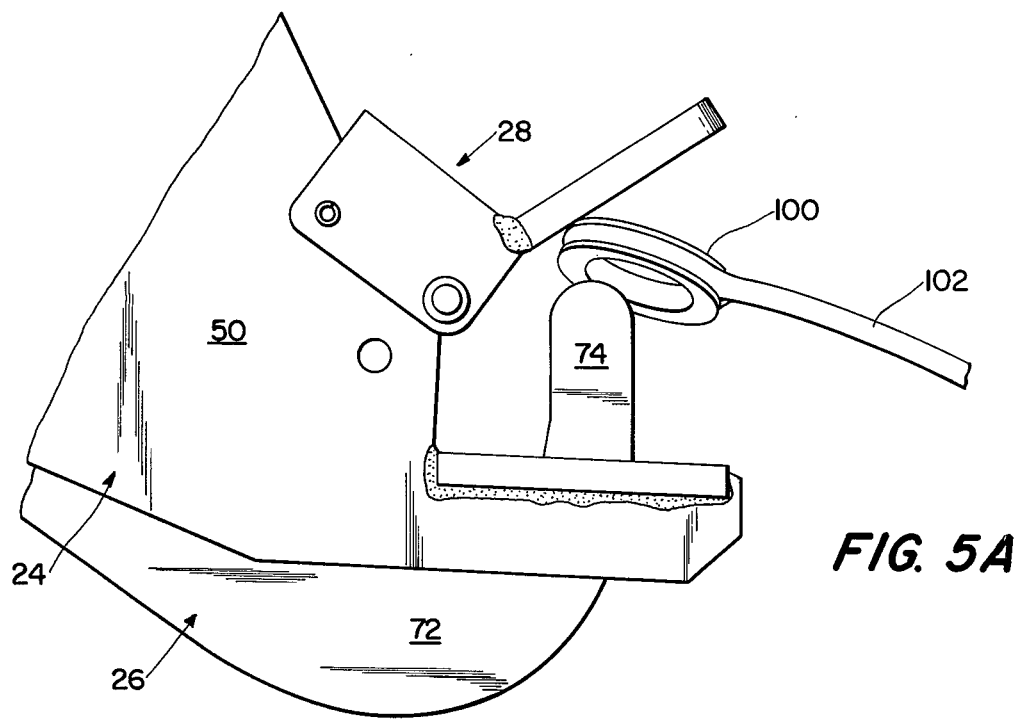
FIG. 5a shows a partial view of the swivel block assembly in the open position.

Disposed proximate the first towline retainer 52 is swivel block assembly or second retainer 28. Assembly 28 is illustrated as a U-shaped member 62 straddling stationary plate 50 and is capable of pivoting about a point 64 from an open position revealed in FIG. 5a to a closed position depicted in FIG. 5b. A rectangular or second retainer plate 66, having a generally rectangular shaped, or second rectangular opening 68, is connected to member 62 in such a way that in the closed position a second open surface 68 may be disposed parallel to the first open surface 56. The swivel block assembly 28 may be fixed in its closed position by a conventional ball lock pin 70.

Figure 4B:
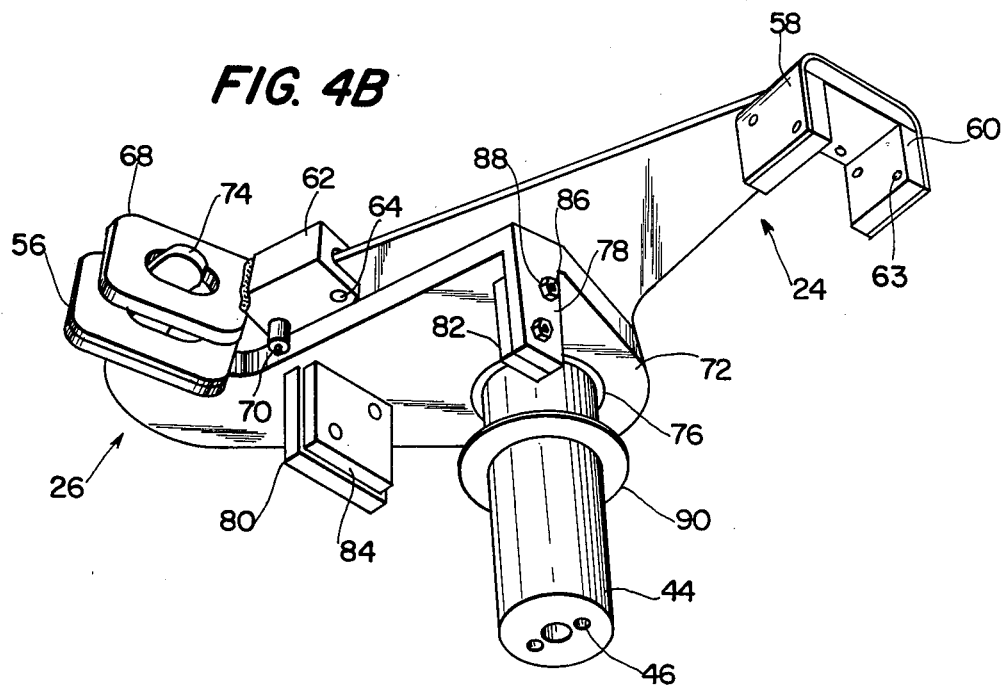
FIG. 4b shows a right side view of the banner towing adapter of the present invention.

Rotatably attached to the attchment pin assembly 22 and parallel to assembly 24 is the hook plate assembly 26 (see FIG. 3). Assembly 26 is shown in FIG. 4b as having a second arm or hook plate 72 terminiating at a distal end with a hook 74. Assembly 26 also comprises a bearing 76 which allows the assembly to rotate about the attachment pin assembly 22 when the arresting tail hook of the aircraft is in the hook down position. The hook plate assembly cooperates with the tail hook 12 by means of outwardly extending bracket plates 78 and 80. As is seen from FIG. 2, flanges 13 and 13' on the tail hook 12 are nestled between the two plates 78 and 80 and are protected from surface and vibration damage by the adapter by means of Teflon spacers 82 and 84. Spacers 82 and 84 are connected to the plates 78 and 80 by means of flush head screws 86 and self locking nuts 88. A freely rotating washer 90 is fitted between the tail hook support structure bracket 16' and the hook plate 72 in order to reduce friction that may occur between them.

Figure 5B:
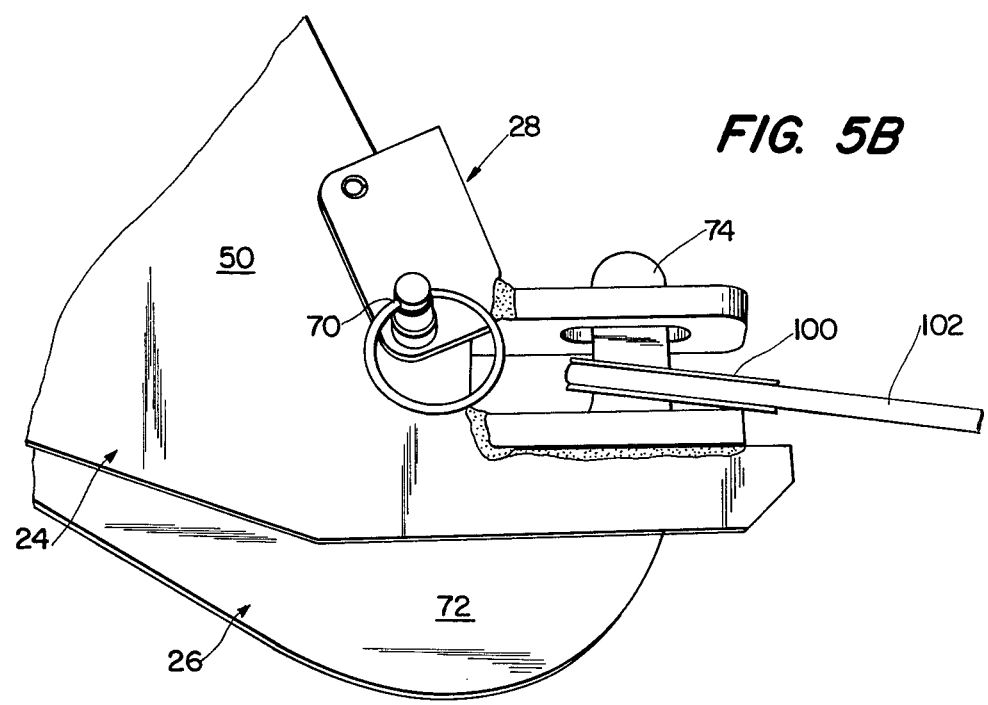
FIG. 5b illustrates a partial view of the swivel block assembly in the closed position.

As can be seen from FIG. 3, the hook plate assembly 26 slidingly abuts the stationary plate assembly 24 with hook 74 passing through the first and second rectangular openings of plates 52 and 66. Thus, first and second retainer plates 52 and 66, respectively, provide for holding a towline on the hook 74. As can be seen from FIG. 5a as the swivel block assembly 28 is pivoted about point 64 to an open position the chain end of a towline attached to the banner desired to be towed can be placed over the hook 74. When the assembly 28 is pivoted into a closed position, as shown in FIG. 5b, the chain end of the towline may be held on the hook and locked in place by means of the ball lock pin 70. So long as the hook plate assembly is in the position shown in FIG. 5b the chain end of the tow line will be held in place but when the hook plate assembly is rotated about the attachment pin assembly (see FIG. 6) the chain end of the towline will be released. Hook plate assembly 26 will rotate in conjunction with a lowering of the tail hook inasmuch as the tail hook flanges are nestled between the plates 78 and 80 (note FIG. 2).

Figure 6:
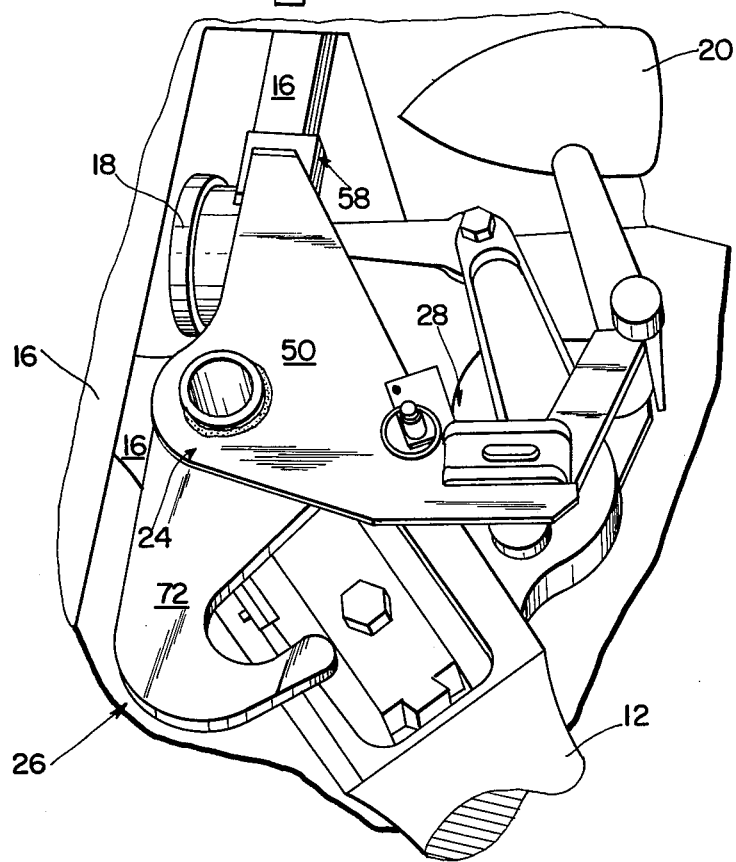
FIG. 6 shows the banner towing adapter when the tail hook is in the hook down position.

Thus, what has been described is an adapter which can be fitted to the hollow tail hook attachment or pivot pin of an aircraft, e.g., the F-14, using a self-contained attachment method (an expanding sleeve which fits within the hollow hook attachment pin of the aircraft) which requires no modifications of the aircraft. Installation merely requires a socket wrench. Thus, installation times are very low, usually about one minute. The safety factor of the adapter is very high because the banner being towed can be released at any time the pilot desires by simply dropping the tail hook as shown in FIG. 6.

It is to be understood therefore that what has been described is merely illustrative of the principles of the invention and that numerous arrangements in accordance with this invention may be devised by one skilled in the art without departing from the spirit and scope thereof.

What is new and desired to be secured by letters patent of the United States is:

1. A towing adapter for use in the towing of a target by an aircraft, said aircraft having pivotable means, said adapter comprising:
    an expanding sleeve for fixing said adapter relative to said aircraft;
    means for hooking a towline from said target, said hooking means being connected to said pivotable means and being rotatable about said expanding sleeve when said pivotable means pivots, said hooking means having a hook;
    means for holding said towline on said hook, said holding means comprising a first and second hook retainer, said first retainer being fixedly disposed on said holding means, said second retainer being pivotable on said holding means about a point proximate said first retainer;
    whereby when said pivotable means pivots away from said aircraft, said hooking means releases said towline and thus said target.

2. A towing adapter as defined in claim 1, wherein said holding means is attached to said aircraft at one point and to said expanding sleeve at another point.

3. A towing adapter as defined in claim 1, wherein said holding means comprises a first upwardly extending arm.

4. A towing adapter as defined in claim 3 wherein said hooking means comprises a second arm.

5. A towing adapter as defined in claim 4, wherein said second arm is rotatably attached to said sleeve.

6. A towing adapter as defined in claim 5, wherein said hook is disposed at the distal end of said second arm.

7. A towing adapter as defined in claim 6, further comprising two plates outwardly extending from said second arm, said pivotable means being nestled between said plates.

8. A towing adapter as defined in claim 4, wherein said first retainer is disposed at the distal end of said first arm.

9. A towing adapter as defined in claim 8, wherein said first and second retainers each comprise an open surface through which said hook may pass.

10. A towing adapter as defined in claim 9, wherein said second retainer is pivotable from an open to a closed position about a fixed point located proximate said first retainer,
    whereby when said second retainer is in the open position, said towline may be placed on said hook and when said second retainer is in the closed position and towline may be held on said hook.

11. A towing adapter as defined in claim 10, wherein said second retainer is parallel to said first retainer when in said closed position, said second retainer being lockable in said closed position by a ball lock pin.

12. A towing adapter as in claim 11, wherein said pivotable means is an arresting tail hook.

13. A towing adapter as in claim 12, wherein said tail hook is mounted on a hollow attachment pin, said expanding sleeve being inserted in said hollow pin.

14. A towing adapter as in claim 13, wherein said hollow pin is attached to said aircraft by support structure, said holding means being attached to said support structure at one point and to said sleeve at another point.

* * * * *